Figure 3:
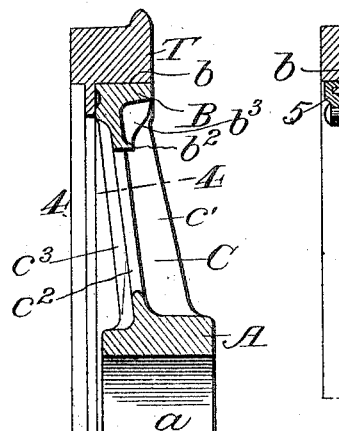

No. 817,454. PATENTED APR. 10, 1906.
J. TAYLOR.
CAR WHEEL.
APPLICATION FILED SEPT. 7, 1905.
2 SHEETS—SHEET 1.
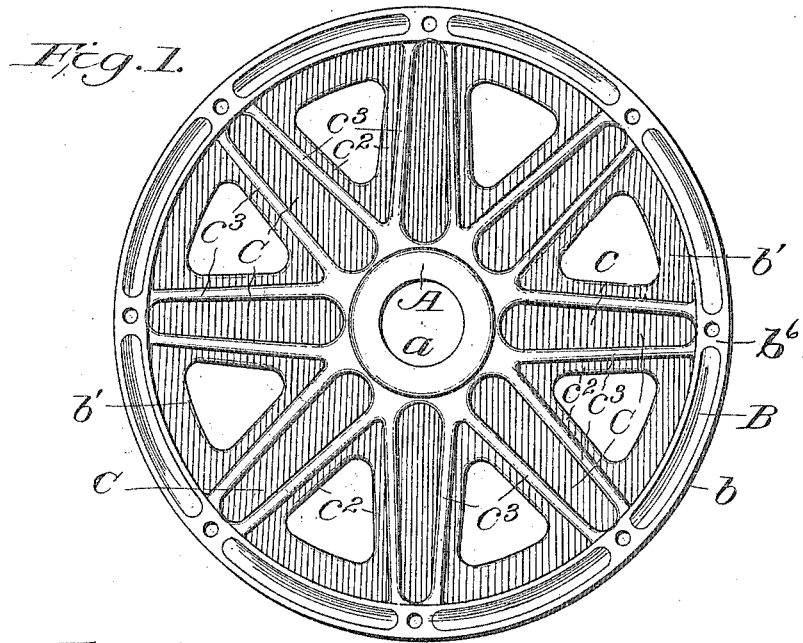
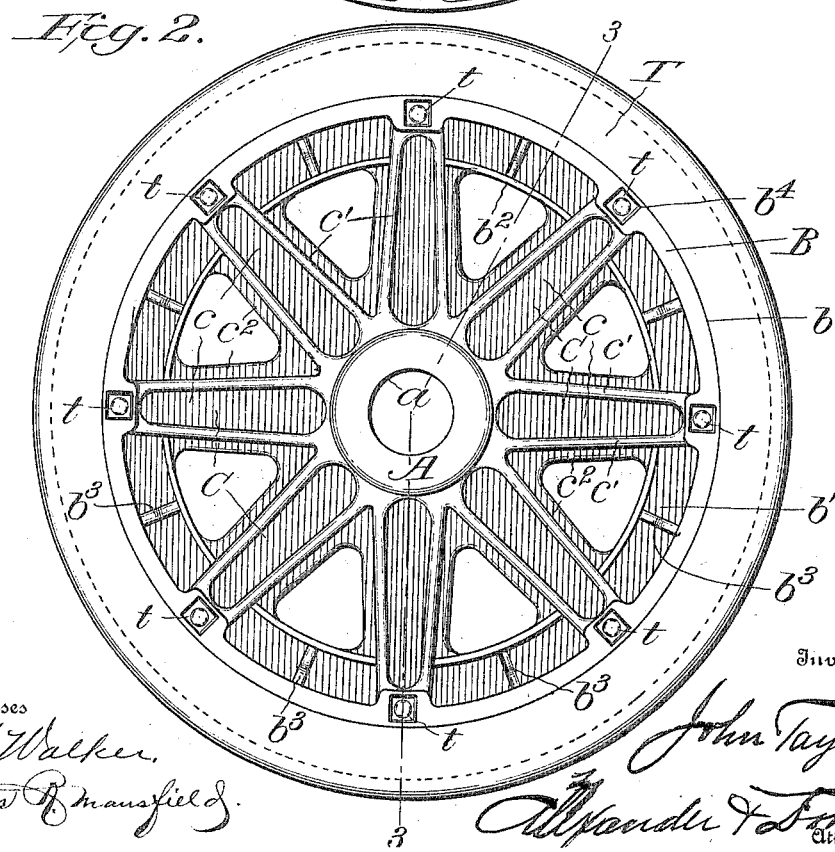

No. 817,454. PATENTED APR. 10, 1906.
J. TAYLOR.
CAR WHEEL.
APPLICATION FILED SEPT. 7, 1905.

2 SHEETS—SHEET 2.

Witnesses
C. H. Walker
James R. Mansfield

Inventor
John Taylor
By Alexander T. Lowell
Attorneys

UNITED STATES PATENT OFFICE.

JOHN TAYLOR, OF TROY, NEW YORK, ASSIGNOR TO THE TAYLOR ELECTRIC TRUCK COMPANY, OF TROY, NEW YORK.

CAR-WHEEL.

No. 817,454.  Specification of Letters Patent.  Patented April 10, 1906.

Application filed September 7, 1905. Serial No. 277,385.

*To all whom it may concern:*

Be it known that I, JOHN TAYLOR, of Troy, in the county of Rensselaer and State of New York, have invented certain new and useful Improvements in Car-Wheels; and I hereby declare that the following is a full, clear, and exact description thereof, reference being had to the accompanying drawings, which form part of this specification.

This invention is an improvement in car-wheels, and has particular reference to the construction of what are commonly known as "wheel-centers," which are the web and hub portions of wheels adapted to be fitted with a steel tire to form a complete wheel.

The objects of the invention are to increase the strength and durability of the wheels, reduce their weight, and lessen their cost. These objects are attained by the invention, as has been practically demonstrated by actual manufacture and use of wheels embodying the invention.

Wheel-centers have heretofore been made in one piece of cast-iron, cast-steel, and forgings and have also been built up of sections assembled and fastened together in various ways.

The principal feature of my invention is a solid malleable-iron wheel-center, which differs essentially both in construction and in service qualities from any of the heretofore-known wheel-centers and which is also novel in construction or form.

The malleable iron of which my wheel-centers are composed is of a peculiar composition and nature. By actual tests it possesses about four times the strength of cast-iron. Consequently as compared with cast-iron centers I make my centers a great deal lighter, and yet of superior strength and durability. For example, one of my wheel-centers for a thirty-four-inch steel tire weighs but two hundred and fifty pounds, whereas a cast-iron center for such a wheel, to have anything like the strength of my wheel-center, would weigh from five hundred to six hundred pounds.

Further, my centers can be repeatedly re-tired, if desired. To do this, it is necessary to press the wheels off and on the axles, and cast-iron centers frequently fracture under such operations, particularly after having been in service some time, whereas my malleable centers are practically indestructible and can be pressed on and off the axle without injury as often as it is necessary to re-tire them.

Another advantage of my malleable wheel-centers is their quietness or noiselessness as compared with cast-iron centers.

Further, my malleable-iron wheel-center is is not affected by extreme variations in temperature, while cast-iron or cast-steel centers are rendered exceedingly brittle by cold.

Cast-steel centers are subject to much the same disadvantages as cast-iron, but can be made lighter than cast-iron, yet nevertheless are much more expensive than malleable iron. Steel wheels are also more resonant than malleable iron and are decidedly objectionable for city service for that reason, the vibrations and noise being transmitted from the rail to the car by such wheels, whereas my malleable-iron centers being tough and dead in the nature of the metal are not resonant and do not transmit noise and vibrations like the cast-steel and cast-iron centers, and therefore by using malleable-iron centers the noise is reduced to a minimum. Cast-steel is also liable to have concealed blow-holes or be "honeycombed." Such defects being below the surface cannot be ordinarily detected and seriously impair the strength and reliability of such centers. My malleable centers owing to their peculiar formation and method of production are free from such defects and are superior to other centers in points of durability and reliability in service and can be made much lighter and stronger than cast-iron centers and much more cheaply than cast-steel centers.

My malleable-iron wheel-center is not forged, but is cast from a pattern; but the iron used in making my malleable centers is a special mixture of air-furnace iron, especially adapted and only adapted for making malleable castings, which castings are rendered malleable by the annealing process. The malleable centers when first cast are so hard that they cannot be worked, and in order to render them susceptible of finishing and "malleable" the castings are placed in cast-iron containers or retorts and embedded in iron scale obtained from rolling-mills. The container when filled is placed in an annealing-oven and subjected to a high heat sufficient to keep the whole mass a bright red for about seven to ten days. Then the container is removed from the oven and emptied, the contents resembling a solid mass of hot material which is knocked apart and the center-castings separated and allowed to cool, and when cool are perfectly malleable, the metal being then as tough as steel, but cheaper, and it is four or five times stronger than the best No. 1 gray or cast iron and as ductile as wrought-iron. This is, in brief, the method in which my malleable centers are produced, and the preferred form thereof is illustrated in the drawings, in which—

Figure 4:
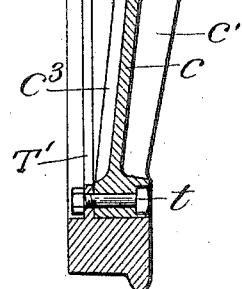

Figure 1 is a front view of the wheel-center; Fig. 2, a rear view thereof in a complete wheel. Fig. 3 is a section of a complete wheel formed with my center. Fig. 4 is a detail cross-section of one of the center ribs or spokes. Figs. 5, 6, 7, 8, and 9 are detail views showing various modes of securing the steel tires to the centers.

Each wheel-center is formed of a malleable casting having a hub portion A, a felly portion B, and intermediate spokes C, connecting the hub and felly portion, all formed integral. The felly portion B is preferably T-shaped in cross-section, as shown, having a broad flat periphery $b$ for the reception of the steel tire T, and a narrow web part $b'$ extending between the spokes C. This web portion $b'$ may be ribbed at its inner edge, as shown at $b^2$, and intermediate the spokes may be stiffened by radially-disposed ribs $b^3$ to prevent flattening of the rim between the spokes. When used with the form of steel tire T shown in Fig. 3, the felly B may be provided with recesses $b^4$ on its inner face for the reception of the heads of the rivets or bolts $t$, by which the center is fastened to the tire.

The spokes C are preferably approximately H-shaped in cross-section, having a web part $c$, from the rear face of which project two deep radially-disposed ribs $c'$ $c'$, and from its front face project two low radially-disposed ribs $c^3$ $c^3$, and from its sides project low ribs $c^2$ $c^2$. The ribs $c'$ $c^3$ extend from the hub A to the felly-tread $b$, while the ribs $c^2$ of adjacent spokes coalesce at the hub and extend to the felly-web portion $b'$ at their outer ends. The hub A is of the usual form and provided with a bore $a$, adapted to engage the car-axle.

The steel tire T may be of any suitable construction and secured to the malleable center in any preferred manner, except that it is not desirable to attempt to fuse it upon the center, as the heat requisite to this operation would be injurious to the malleable center.

Figure 5:
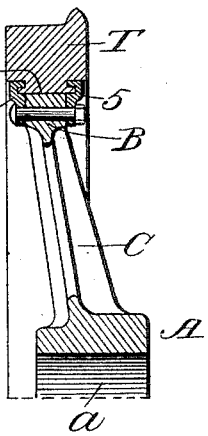
Figure 6:
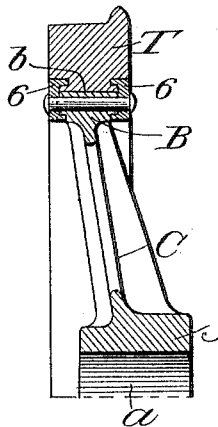
Figure 7:
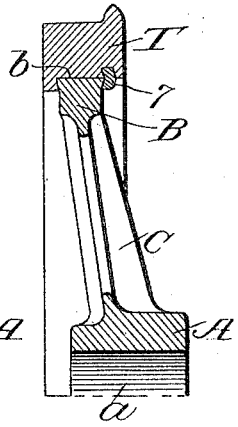
Figure 8:
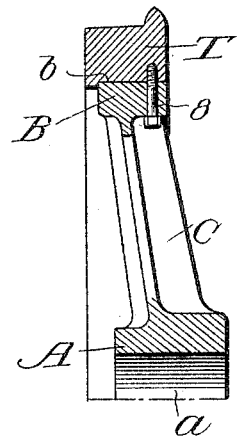
Figure 9:
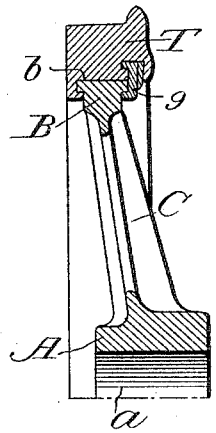

As shown in Fig. 3, the tire is bolted to the center. In Fig. 5 the tire is shown as secured to the center by single lip-retaining rings 5. In Fig. 6 it is shown as secured by double-lip "Mansell" retaining-rings 6. In Fig. 7 it is shown as shrunk on the center and secured by the "Gibson" fastening-ring 7. In Fig. 8 it is shown as shrunk on the center and retained by screws 8, and in Fig. 9 it is shown as retained by a "Carlton-Stroudley" fastening 9. There are various other methods in which the steel tire may be secured to the malleable centers, and the tire can be shrunk on, bolted, riveted, or secured by any of the so-called "steel-tire fastenings." I do not claim any feature of the steel tire or its fastenings herein, but merely the malleable center, which can readily be adapted to any desired style of tire or tire-fastening.

Some of the essential differences between a malleable center and the cast-iron and cast-steel centers heretofore used are stated above, and it would be impossible to make a cast-iron center as light in weight as the malleable and retain sufficient strength and durability for practical purposes, and it would be practically impossible to forge my wheel-center out of wrought metal.

The peculiar structure of the center with the provision of strengthening-ribs increases its strength, reduces its weight, and lessens the possibility of any inherent defects in the metal passing undiscovered. I expressly disclaim a cast-iron or cast-steel center, also a pressed-steel or rolled steel or iron center; but a malleable-iron center I believe to be wholly novel, and it produces a better and cheaper wheel than any heretofore made.

An additional advantage of the wheel-center and wheel, as shown in Figs. 1 to 3, is that the center can be accurately re-tired without complicated or expensive machinery, for the reason that the periphery of felly $b$ is turned true and its outer edge $b^6$ is faced perfectly true, so as to exactly fit within the tire and against the flange T' thereof, and as the center-hub is bored to exactly and accurately fit the axle the wheel will run absolutely true when the center is fixed on the axle. If the tire needs renewing, it is removed by unfastening the bolts or rivets and forced off the rim and another new tire, accurately turned to fit the center, is placed thereon and secured thereto and the wheel replaced on axle without any necessity of reboring the hub to secure true running. Ordinarily it is necessary to rebore the wheel-centers when re-tired in order to insure true running, and this reboring obviously necessitates another axle.

Having thus described my invention, what I therefore claim as new, and desire to secure by Letters Patent thereon, is—

1. A malleable-iron wheel-center, having a hub, felly and spokes formed integral, the spokes being approximately H-shaped in cross-section.

2. A malleable-iron wheel-center, having a hub, felly and spokes formed integral, the felly being approximately T-shaped in cross-section, and the spokes being approximately H-shaped in cross-section.

3. A malleable-iron wheel-center, having a hub, radially-extending spokes, and a felly having an interior web portion, all formed integral, the web portion of the felly being provided, intermediate the spokes, with radial ribs, substantially as described.

4. A malleable-iron wheel-center, having a hub, radially-extending ribbed spokes, and a felly having an interior web portion, all formed integral, the web portion of the felly being provided intermediate the spokes with radial rib, substantially as described.

5. A car-wheel comprising a malleable-iron wheel-center, having a hub, felly and spokes formed integral, the spokes being approximately H-shoped in cross-section; and a steel tire secured to said center, substantially as described.

6. A car-wheel comprising a malleable-iron wheel-center, having a hub, felly and spokes formed integral, the felly being approximately T-shaped in cross-section, and the spokes being approximately H-shaped in cross-section; and a steel tire secured to the felly, substantially as described.

7. A car-wheel comprising a malleable-iron wheel-center having a hub, radially-extending spokes, and a felly having an interior web portion, all formed integral, the web portion of the felly being provided, intermediate the spokes, with radial ribs; and a steel tire attached to said center, substantially as described.

8. A car-wheel comprising a malleable-iron wheel-center having a hub, radially-extending ribbed spokes, and a felly having an interior web portion, all formed integral, the web portion of the felly being provided intermediate the spokes with radial ribs; and a steel tire secured to said center, substantially as described.

9. A malleable-iron wheel-center of uniform composition or constituency throughout, substantially as described.

10. As an article of manufacture, a homogeneous malleable-iron wheel-center for car-wheels having a hub felly and connections formed integral, substantially as described.

11. A car-wheel comprising a homogeneous malleable-iron wheel-center, and a separately-formed tire secured to said center, substantially as described.

12. A car-wheel comprising a homogeneous one-piece malleable-iron wheel-center, and a steel tire removably secured to said center.

13. As an article of manufacture, a homogeneous malleable-iron wheel-center having its hub felly and connections formed integral, the felly being approximately T-shaped in cross-section.

14. A car-wheel comprising a homogeneous malleable-iron wheel-center having its hub felly and spokes formed integral; and a steel tire secured to said center, substantially as described.

15. A car-wheel comprising a homogeneous malleable-iron wheel-center having its hub felly and connections formed integral, the felly being approximately T-shaped in cross-section; and a steel tire secured to said felly, substantially as described.

16. A wheel comprising a homogeneous malleable-iron wheel-center having its felly provided with recesses in line with the heads of the tire-fastenings, a tire encircling the center, and tire-fastening bolts, substantially as described.

17. A wheel comprising a malleable-iron wheel-center having a hub felly and spokes all formed integral, said felly having recesses in line with the center of the spokes to receive the heads of the tire-fastening bolts; a tire encircling the center, and tire-fastening bolts, substantially as described.

18. In a car-wheel, the combination of a wheel-tire having its inner periphery bored to fit the periphery of the center and also having an internal flange dressed to fit against the edge of the center felly; with a homogeneous malleable-iron wheel-center having its felly provided with recesses in the side of the felly opposite the tire-flange, and fastening devices transfixing the felly and tire-flange and having their heads in said recesses, substantially as described.

19. In a car-wheel, the combination of a wheel-tire having its inner periphery bored to fit the periphery of the center and also having an internal flange dressed to fit against the edge of the center felly; with a homogeneous malleable-iron wheel-center having its hub spokes and felly formed integral, and provided with recesses in the side of the felly opposite the tire-flange, and fastening-bolts transfixing the felly and tire-flange and having their heads in said recesses, substantially as described.

20. A malleable-iron wheel-center having its hub, felly and spokes all formed integral, and the spokes longitudinally ribbed.

21. A malleable-iron wheel-center having a hub, a felly angular in cross-section and spokes connecting the felly and hub and formed integral therewith, said spokes being longitudinally ribbed.

In testimony that I claim the foregoing as my own I affix my signature in presence of two witnesses.

JOHN TAYLOR.

In presence of—
FRANK SHRAUDER,
WILLIAM S. HOPKINS.